(12) United States Patent
Lopez et al.

(10) Patent No.: US 9,182,226 B2
(45) Date of Patent: Nov. 10, 2015

(54) HAND-HELD LASER DISTANCE MEASURING DEVICE

(75) Inventors: Eladio Lopez, La Croix/Lutry-VD (CH); Jan Weingarten, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 13/976,893

(22) PCT Filed: Nov. 23, 2011

(86) PCT No.: PCT/EP2011/070734
§ 371 (c)(1), (2), (4) Date: Sep. 16, 2013

(87) PCT Pub. No.: WO2012/089420
PCT Pub. Date: Jul. 5, 2012

(65) Prior Publication Data
US 2014/0016114 A1   Jan. 16, 2014

(30) Foreign Application Priority Data

Dec. 28, 2010 (DE) .......................... 10 2010 056 156
Mar. 9, 2011 (DE) .......................... 10 2011 005 277

(51) Int. Cl.
| | |
|---|---|
| *G01C 3/08* | (2006.01) |
| *G01C 15/00* | (2006.01) |
| *G01S 17/08* | (2006.01) |
| *G01S 17/42* | (2006.01) |
| *G01S 17/46* | (2006.01) |

(Continued)

(52) U.S. Cl.
CPC ................ *G01C 3/08* (2013.01); *G01C 15/002* (2013.01); *G01S 17/02* (2013.01); *G01S 17/08* (2013.01); *G01S 17/42* (2013.01); *G01S 17/46* (2013.01); *G01S 17/87* (2013.01)

(58) Field of Classification Search
CPC .......... G01C 3/08; G01S 17/875; G01S 7/499
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 2003/0098973 A1* | 5/2003 | Schmidt et al. | 356/213 |
| 2004/0114129 A1* | 6/2004 | Gogolla et al. | 356/4.01 |

(Continued)

FOREIGN PATENT DOCUMENTS

| | | |
|---|---|---|
| CN | 101111740 A | 1/2008 |
| CN | 101421584 A | 4/2009 |

(Continued)

OTHER PUBLICATIONS

International Search Report corresponding to PCT Application No. PCT/EP2011/070734, mailed Mar. 8, 2012 (German and English language document) (7 pages).

*Primary Examiner* — Luke Ratcliffe
(74) *Attorney, Agent, or Firm* — Maginot, Moore & Beck LLP

(57) ABSTRACT

The disclosure is based on a hand-held laser distance measuring device comprising at least one laser unit which is configured to determine a first distance using a laser beam emitted in a first relative direction. The laser unit is further configured to determine at least one second distance, near instantaneously, using a laser beam emitted in at least one second relative direction which differs from the first relative direction.

12 Claims, 5 Drawing Sheets

(51) Int. Cl.
*G01S 17/02* (2006.01)
*G01S 17/87* (2006.01)

(56) References Cited

U.S. PATENT DOCUMENTS

2005/0057745 A1* 3/2005 Bontje .................... 356/139.03
2006/0197921 A1* 9/2006 Kurosu et al. .................. 353/70
2006/0201006 A1 9/2006 Burlingham et al.
2007/0064246 A1* 3/2007 Braunecker et al. .......... 356/614
2008/0088817 A1* 4/2008 Skultety-Betz et al. ..... 356/4.01

FOREIGN PATENT DOCUMENTS

| DE | 100 16 309 A1 | 10/2001 |
| DE | 10 2005 004 321 A1 | 8/2006 |
| WO | 01/75396 A1 | 10/2001 |

* cited by examiner

HAND-HELD LASER DISTANCE MEASURING DEVICE

This application is a 35 U.S.C. §371 National Stage Application of PCT/EP2011/070734, filed on Nov. 23, 2011, which claims the benefit of priority to Serial No. DE 10 2010 056 156.8, filed on Dec. 28, 2010 in Germany, and to Serial No. DE 10 2011 005 277.1, filed on Mar. 9, 2011 in Germany, the disclosures of which are incorporated herein by reference in their entirety.

BACKGROUND

The disclosure proceeds from a handheld laser distance measuring device as described herein.

A handheld laser distance measuring device comprising at least one laser unit, which is provided to determine a first distance in a first relative direction using a laser beam, has already been proposed.

SUMMARY

The disclosure proceeds from a handheld laser distance measuring device comprising at least one laser unit, which is provided to determine a first distance in a first relative direction using a laser beam.

It is proposed that the laser unit is provided to determine, almost simultaneously, at least one second distance in at least one second relative direction, which differs from the first relative direction, using a laser beam. In particular, "handheld" should be understood to mean that the laser distance measuring device is provided to be at least guided, preferably be carried, manually by an operator during a measurement process. The laser distance measuring device preferably has a mass of less than 2 kg, particularly preferably less than 1 kg. In particular, a "laser unit" should be understood to mean a device which is provided to emit a laser beam with more than 50% of its power within an aperture angle of less than 2 degrees, advantageously less than 0.5 degrees, particularly advantageously less than 0.1 degrees. The laser unit preferably has a laser whose laser beam is pivoted to-and-fro, in particular continuously, between the two relative directions; to be precise, in particular with a frequency of greater than 2 Hz, preferably greater than 10 Hz, particularly preferably greater than 20 Hz. Alternatively, or in addition thereto, the laser unit could have at least two lasers and/or at least two sensors, which are respectively provided to determine the distance in different relative directions. In particular, "provided" should be understood to mean specifically programmed, designed and/or equipped. In particular, a "relative direction" should be understood to mean a direction relative to a housing of the laser distance measuring device. Hence the laser distance measuring device almost simultaneously determines distances to at least two different measurement points. The laser unit is preferably provided to determine distances in at least three relative directions, advantageously in at least four relative directions, particularly almost simultaneously. The laser unit is preferably provided to determine, particularly almost simultaneously, a determined number of distances, in particular a number which can be set by an operator, with different relative directions on a plane within an angular range. The laser unit preferably captures an alignment of the relative directions, in particular relative to one another and/or advantageously relative to a housing of the laser distance measuring device. Alternatively, or in addition thereto, the laser unit is provided to capture, control and/or preferably regulate an angle between the at least two relative directions.

In this context, a "distance" should be understood to mean a path length between the laser unit and a measured surface of a measurement object, which at least partly reflects the laser beam in the direction of the laser unit during a measurement. The laser unit preferably comprises a sensor, which is provided to capture some of the light reflected by the measured surface. The sensor preferably comprises several photodetectors, which receive reflected light from several, different angular regions by a reception optical unit. The photodetectors are preferably arranged in two-dimensional fashion on a surface. Alternatively, a single photodetector of the sensor could receive reflected light from all relative directions and/or a single photodetector of the sensor could receive the reflected light by means of a semi-transparent and/or a minor transparent from one side, which is at least partly arranged in the non-reflected laser beam. The laser unit in particular preferably determines a run time of a laser pulse from the laser beam between an emission and a reception by the laser unit. Alternatively, or in addition thereto, the laser unit could determine the path to a different characteristic variable appearing useful to a person skilled in the art, for example by triangulation and/or by a phase shift, in particular of a signal modulated onto the laser beam. In this exemplary embodiment, "almost simultaneously" should, in particular, be understood to mean that the laser unit is provided to determine at least two distances within 500 ms, advantageously within 100 ms, particularly advantageously within 50 ms. Between determining the two distances, the laser unit remains, in particular, unmoved, in particular except for a laser beam guidance means. In this context, "different" should more particularly be understood to mean that, in at least one operating state, there should be an acute angle of greater than 5 degrees, advantageously of greater than 30 degrees, between the first relative direction and the second relative direction. As a result of the embodiment according to the disclosure of the laser distance measuring device, a convenient measurement of paths is possible with particularly small design complexity. In particular, the operator can measure a path between two points which can only be reached by the laser beam, without having to place the laser distance measuring device onto one of the points. In so doing, such a path can be measured particularly advantageously by pressing a button and/or within a short period of time, in particular within less than one second. The operator can, in order to measure the path, advantageously be situated at a position at a distance from the path. In addition to a path at a distance from the laser distance measuring device, the laser distance measuring device is provided to determine and output a distance between the laser unit and the measurement point using the laser beam.

In a further embodiment, it is proposed that the laser unit comprises a laser beam guidance means, which is provided to guide the laser beam into the different relative directions, as a result of which it is possible to determine a distance at several positions by means of a simple design using a single laser. A "laser beam guidance means" should be understood to mean a means appearing useful to a person skilled in the art, but preferably a spatial light modulator (SLM), a refractive optical unit, a mechanism for pivoting a laser of the laser unit, the sensor of the laser unit and/or an optical unit of the laser unit, a micromirror array with several micromirrors, but particularly preferably a single micromirror. In particular, a micromirror has a mirror surface of less than 4 mm$^2$, advantageously less than 1 mm$^2$, particularly advantageously less than 0.1 mm$^2$. The mirror surface can preferably be pivoted toward at least one direction, preferably in two directions, by means of an electric signal, in particular via an electrostatic actuator. The laser beam guidance means preferably pivots the laser beam continuously over an in particular constant angular range. Individual measurement points could advantageously be achieved by cycling the laser and/or by a stop and could be marked for the operator by means of another laser, more particularly having a different color. In this case, a laser determining the distances could be invisible.

Moreover, it is proposed that the laser distance measuring device comprises a computer unit, which is provided to set an angle at least between the first relative direction and the second relative direction, as a result of which a particularly precise, fast and flexibly adjustable alignment of the relative directions of the laser beam or the laser beams is possible. A "computer unit" should in particular be understood to mean a unit with an information input, information processing and an information output. The computer unit advantageously comprises at least one processor, input interfaces, output interfaces and/or, advantageously, operating programs, regulating routines, control routines and/or calculation routines stored in a memory of the computer unit. In particular, the term "set" should be understood to mean that the computer unit outputs at least one characteristic variable, which is provided to control and/or to regulate the laser beam guidance means for adjusting the relative direction.

It is furthermore proposed that the computer unit is provided to regulate the laser beam guidance means in an operating mode by virtue of a measurement point of the first relative direction and a measurement point of the second relative direction being arranged at a predetermined distance from one another, as a result of which an operator can display and check paths on an surface in a particularly convenient manner. By way of example, the operator can check very quickly whether a cabinet with a given width fits into an available niche. An "operating mode" should be understood to mean an operating state, at least of the computer unit, which can be influenced by an operator by virtue of the computer unit executing regulating routines, control routines and/or calculation routines which can be selected by a user. The computer unit is preferably provided to execute different ones thereof. In this context, "regulating" should in particular be understood to mean that the computer unit determines a distance between the two measurement points, compares the determined distance with the distance prescribed by the operator in particular and then modifies the angle between the relative directions in such a way that the measurement points are arranged spaced apart at the predetermined distance. In particular, a "measurement point" should be understood to mean a region of the measured surface, which reflects the laser beam and is measured by the computer unit during operation.

Moreover, it is proposed that the laser distance measuring device comprises an input unit, by means of which an angle, at least between the first relative direction and the second relative direction, can be set, as a result of which a particularly convenient and versatile operation is possible. An "input unit" should, in particular, be understood to mean a unit, in particular with a haptic element, which is provided to provide a characteristic variable, which can be influenced by an operator, for mechanical and/or advantageously electric control of the computer unit and/or laser unit.

Furthermore, it is proposed that the laser distance measuring device comprises a computer unit which is provided to determine at least one contour of a measurement object, as a result of which a particularly convenient, fast and accurate determination of a path, starting from the contour, and/or at least one property of the contour, for example a radius, a focus of an ellipse, is possible. In particular, a "contour of a measurement object" should be understood to mean a bend, an edge, a hole and/or another change in a structure appearing useful to a person skilled in the art and/or an alignment of a measured surface along at least one path extending on the measured surface. The computer unit preferably measures, by means of the laser unit, a profile of the path on the measured surface and determines, by means of a calculation routine, a contour of the measured surface.

Moreover, it is proposed that the laser distance measuring device comprises a computer unit which is provided to determine at least one distance from a measured surface to a measurement point, as a result of which a particularly versatile operation is possible. In particular, a "distance from a surface to a measurement point" should be understood to mean a minimum distance between a plane spanned by the surface and the point.

Furthermore, it is proposed that the laser distance measuring device comprises a computer unit which is provided to determine an angle of intersection between at least two measured surfaces, as a result of which convenient measuring of angles can be achieved. In particular, in this context, an "angle of intersection" should be understood to mean an angle facing the laser unit between two planes spanned by the measured surfaces, which angle lies in a measurement plane spanned by the laser unit and measurement points.

In an advantageous embodiment of the disclosure, it is proposed that the laser unit is provided to generate at least one projection line, as a result of which a measured path can be displayed in a particularly advantageous manner. In particular, a "projection line" should be understood to mean a full and/or dotted line drawn on the measured surfaces by means of the laser unit. The laser unit advantageously generates the projection line continuously, for example by means of an optical unit. The laser unit particularly advantageously generates the projection line by virtue of repeatedly moving a laser point over the measurement object such that an operator perceives a line. The laser unit preferably comprises a laser with a first wavelength for determining the distances and/or for generating the projection line and at least one second laser with a second wavelength for marking measurement points, measured contours and/or other points appearing useful to a person skilled in the art.

Furthermore, it is proposed that the laser unit is provided to project a value of a length of a distance onto the measurement object in particular, as a result of which a particularly convenient display is possible. The laser preferably projects the value which determines at least the first distance. Alternatively, or in addition thereto, the laser unit has a projection laser, in particular with a different color, and/or another, in particular multicolored, projection device appearing useful to a person skilled in the art. Alternatively, or in addition thereto, the laser distance measuring device comprises a projector, in particular a DLP, LCD and LCoS projector, preferably with a light-emitting diode as light source.

Moreover, it is proposed that the laser distance measuring device comprises a position capture unit which is provided to capture at least one alignment of at least the laser unit in space, as a result of which trembling of a hand of the user is advantageously damped and further information relating to determining the path and/or alignment can be determined. In particular, a "position capture unit" should be understood to mean a unit which is provided at least to capture an alignment of at least the laser unit at least relative to gravity. The position capture unit is preferably also provided to establish an acceleration in a spatial direction and/or a rotation about an axis, which, for example, is aligned parallel to the direction of gravity in order to establish a horizontal path. By way of example, a perpendicular and/or horizontal arrangement of a measurement plane of the laser unit could be output to the user.

Furthermore, it is proposed that the computer unit is provided to calculate a further distance at least from an alignment captured by the position capture unit and two distances measured in a same relative direction, as a result of which the laser distance measuring device can be employed in a particularly versatile way. In particular, a surface can be calculated with a simple design using distances determined in two relative directions and the distance captured by the distance capture unit. Here, the laser plane of the laser unit is pivoted over the surface and it is measured thereby. The computer unit preferably captures during the pivoting contours delimiting the surface and aligns the relative directions accordingly.

BRIEF DESCRIPTION OF THE DRAWINGS

Further advantages emerge from the following description of the drawing. The drawing illustrates two exemplary embodiments of the disclosure. The drawing, the description and the claims contain several features in combination. A person skilled in the art will expediently also consider the features individually and combine these to form further useful combinations.

In detail.

DETAILED DESCRIPTION

Figure 1:
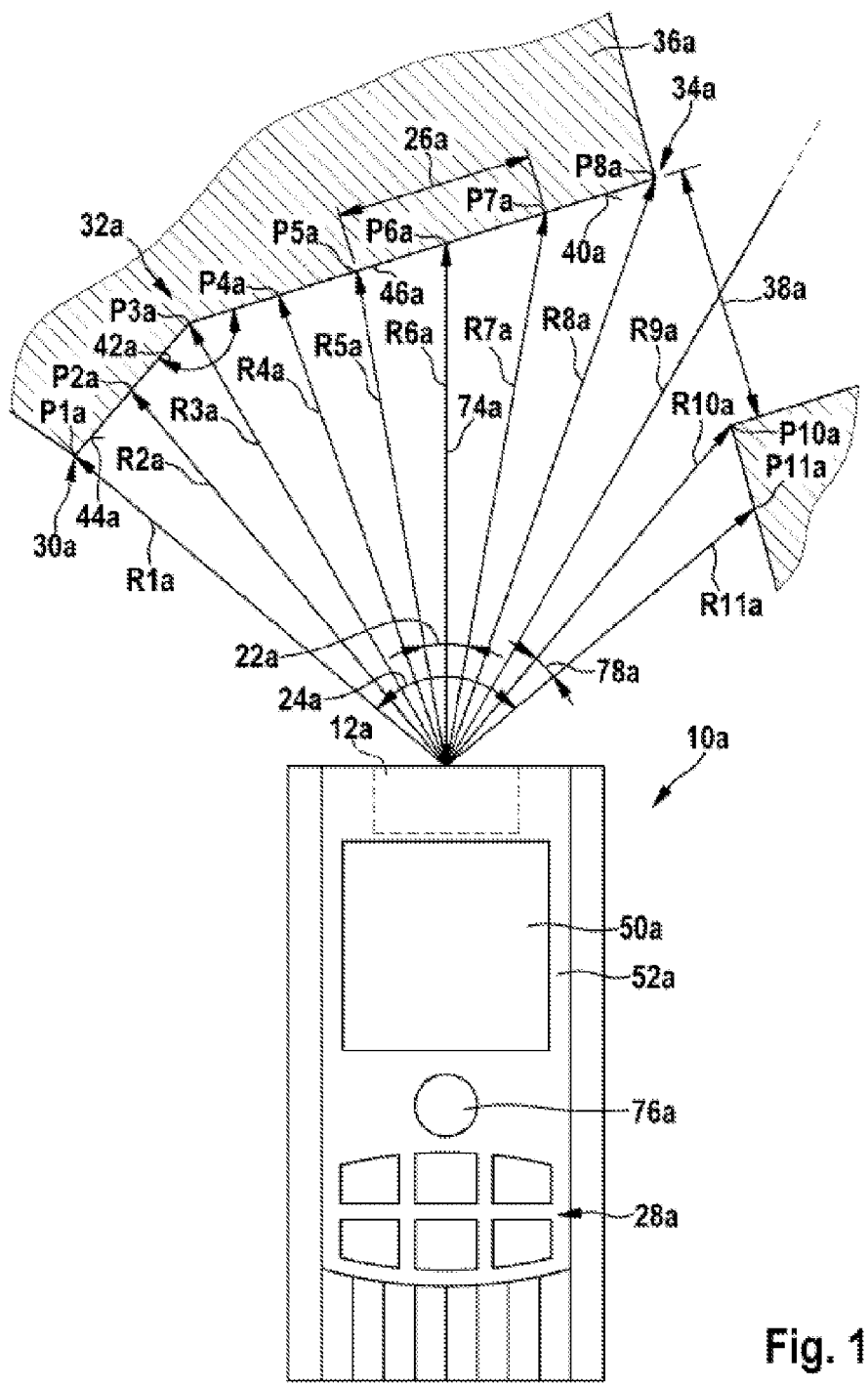
FIG. 1 shows a handheld laser distance measuring device according to the disclosure and a measurement object.

FIG. 1 shows a handheld laser distance measuring device 10a according to the disclosure, comprising a laser unit 12a, an input unit 28a, a display 50a and a housing 52a. During a measurement operation with a laser beam 14a, the laser unit 12a determines several distances almost simultaneously in different relative directions R1a-R11a. FIG. 1 illustrates eleven exemplary relative directions R1a-R11a. An operator operates the laser distance measuring device 10a by means of the input unit 28a. The display 50a shows measurement results to the user. It has a display driver (not illustrated in any more detail).

Figure 2:
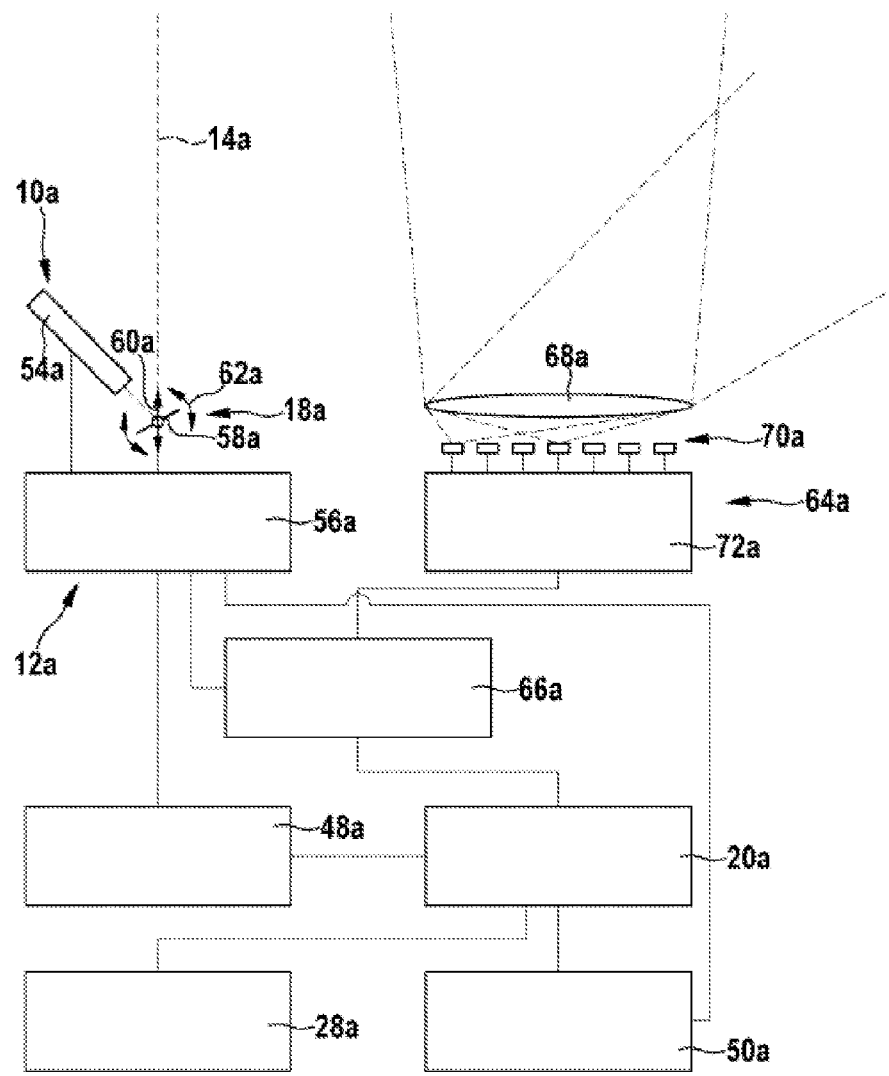
FIG. 2 shows the laser distance measuring device from FIG. 1 in a functional diagram.

FIG. 2 shows that the laser unit 12a comprises a laser beam guidance means 18a, a laser 54a and an actuation unit 56a. During operation, the actuation unit 56a controls the power of the laser 54a and a deflection of the laser beam guidance means 18a. The laser beam guidance means 18a comprises a MEMS-mirror. The actuation unit 56a is provided to tilt a micromirror 58a of the laser beam guidance means 18a about axes 60a, 62a aligned perpendicular to one another. Alternatively, the actuation unit 56a could tilt the micromirror 58a only about one axis and/or the actuation unit 56a could tilt two micromirrors, arranged in succession in the laser beam, respectively about one axis, which axes are aligned perpendicular to one another. By tilting the micromirror 58a, the laser unit 12a guides the laser beam 14a in different relative directions R1a-R11a, i.e. in different directions relative to the housing 52a, during a measurement process.

The laser unit 12a comprises a sensor 64a and a synchronization unit 66a. The sensor 64a comprises an optical unit 68a, photodetectors 70a and a read-out unit 72a. The optical unit 68a guides light reflected from a measurement object 36a substantially onto one of the photodetectors 70a, to be precise depending on the relative directions R1a-R11a. The optical unit 68a preferably comprises at least one micromirror array. The read-out unit 72a processes the signals from the photodetectors 70a; to be precise it amplifies the signals and serializes the signals. The synchronization unit 66a controls or regulates transmitting the laser beam 14a and, by means of the optical unit 68a, receiving the reflected light of the laser beam 14a. The synchronization unit 66a determines a characteristic variable, which depends on the distances and which is read by a computer unit 20a.

The laser distance measuring device 10a comprises the computer unit 20a and a position capture unit 48a. The computer unit 20a controls the display 52a and the synchronization unit 66a and queries the input unit 28a. The computer unit 20a provides various measurement modes. The position capture unit 48a comprises a 3-axis acceleration sensor (not illustrated in any more detail) for capturing gravity and determining accelerations and gyroscopes for capturing rotational movements about all axes. The position capture unit 48a is connected directly to the actuation unit 56 for damping trembling movements of the operator.

In a first measuring mode, the laser unit 12a transmits the laser beam 14a along a central relative direction R6. From a run time of a pulse of the laser beam 14a, the computer unit 20a determines a distance 74a between a measurement point P6 of the measurement object 36a and the laser unit 12a. The computer unit 20a displays a value of the distance 74a on the display 50a so that the operator can read it. Moreover, the computer unit 20a displays the value of the distance 74a on the measurement object 36a by virtue of the laser unit 12a projecting the latter onto the measurement object 36a. To this end, the actuation unit 56 is connected to the display 50a.

In a second measurement mode, the laser unit 12a alternately transmits the laser beam 14a into a first relative direction R5 and into a second relative direction R7. The input unit 28a has a knob 76a. By actuating the knob 76a, the operator can set an angle 22a between the two relative directions R5, R7. The laser unit 12a comprises a sensor (not illustrated in any more detail), which captures the angle between the relative directions R1a-R11a during operation. The computer unit 20a calculates a distance 26a between the measurement points P5a, P7a. To this end, the computer unit 20a uses an implementation of the cosine law.

In a third measurement mode, the operator provides a distance 26a between two measurement points P5, P7 by means of the input unit 28a. The computer unit 20a regulates an angle 22a between two relative directions R5, R7. As a result, the two measurement points P5, P7 are arranged at the set intended distance from one another on a straight line.

In a fourth measurement mode, the operator sets an angle 24a between two outer relative directions R1a, R11a by means of the input unit 28a. The computer unit 20a sends the laser beam 14a into a number of relative directions R1a-R11a, which number can be set. Alternatively, or in addition thereto, it could be possible to set an angle 78a between two adjacent relative directions R1a-R11a. The computer unit 20a determines distances between adjacent measurement points P1a-P8a and calculates, by forming sums, a length of a measurement path along the measurement object 36a. If a distance between two adjacent measurement points exceeds a threshold and/or if a measurement in a relative direction R9a is not possible, the computer unit 20a warns the operator by optical, acoustic and/or haptic means. The operator can select whether he ignores these circumstances or interrupts a measurement path at a measurement point P8a which is adjacent and/or facing the center. Moreover, the computer unit 20a is provided to optimize the calculation of the path by filter routines, e.g. by "least-squares fitting", appearing useful to a person skilled in the art. Moreover, the computer unit 20a is provided to calculate surfaces by virtue of multiplying two paths aligned perpendicular to one another, which paths were measured in succession and/or, advantageously, almost simultaneously.

In a further embodiment of the fourth measurement mode, the computer unit 20a has a calculation routine (not illustrated in any more detail) which determines contours 30a, 32a, 34a of a measurement object 36a during a measurement operation. By way of example, the calculation routine could have a RANSAC algorithm (Random Sample Consensus algorithm). The computer unit 20a has a regulating routine (not illustrated in any more detail), which aligns a measurement point P1a, P3a, P8a precisely on a center of the captured contour 30a, 32a, 34a. The laser unit 12a has a second laser (not illustrated in any more detail) with a color that differs from the first laser 54a. By means of the second laser, the calculation routine 20a marks captured contours and paths selected for being measured. The laser unit 12a generates a projection line 46a by means of the first laser, which projection line indicates a position of the currently measured path. Alternatively, or in addition thereto, the laser unit 20a could almost simultaneously measure several paths separated by captured contours 30a, 32a, 34a and project the measurement results onto the measurement object 36a next to the paths.

In a fifth measurement mode, the computer unit 20a determines a perpendicular distance 38a from a surface 40a to a measurement point P10a, P11a on another surface. To this end, the computer unit 20a measures an alignment of the surface 40a on the measurement plane, for example by two measurement points P5a, P7a, and the measurement point P10a, P22a on the other surface.

In a sixth measurement mode, the computer unit 20a determines the alignment of two surfaces 40a, 44a; to be precise on the measurement plane of the laser unit 12a. From the alignments, the computer unit 20a calculates an angle of intersection 42a between the two surfaces 40a, 44a.

In a seventh measurement mode (not illustrated in any more detail), the computer unit 20a determines a movement of the laser unit 12a; to be precise, by means of the alignments and accelerations captured by the position capture unit 48a. As a result, it is possible to determine the size of a surface by virtue of the operator pivoting the measurement plane of the laser unit 12a over the measurement object 36a by means of a manual movement. In so doing, the computer unit 20a calculates a further distance on the measurement object 36a, to be precise in the pivot direction, from an alignment captured by the position capture unit 48a and two distances measured in a same relative direction R1a-R11a. The computer unit 20a automatically traces contours 30a, 32a, which delimit the surface.

As an alternative or in addition to the seventh measurement mode, the computer unit 20a could measure the surface via a deflection of the laser beam 14a in two mutually perpendicularly aligned directions, as a result of which measurement points are arranged on the surface in two dimensions. Moreover, the position capture unit 48a assists the operator with a horizontal and/or vertical alignment of the laser unit 12a by virtue of indicating these alignments to the operator in an optical, acoustic and/or haptic fashion. To this end, the position capture unit 48a could, for example, comprise a vibration means.

In a further measurement mode (not illustrated in any more detail), the computer unit 20a captures a property of a contour. To this end, the computer unit 20a has a calculation routine which identifies a contour, for example a circular contour of a column. On the display, the computer unit 20a displays properties of the contour, such as e.g. a radius, a diameter, a base area and/or values, such as a volume, calculated from the properties.

Figure 3:
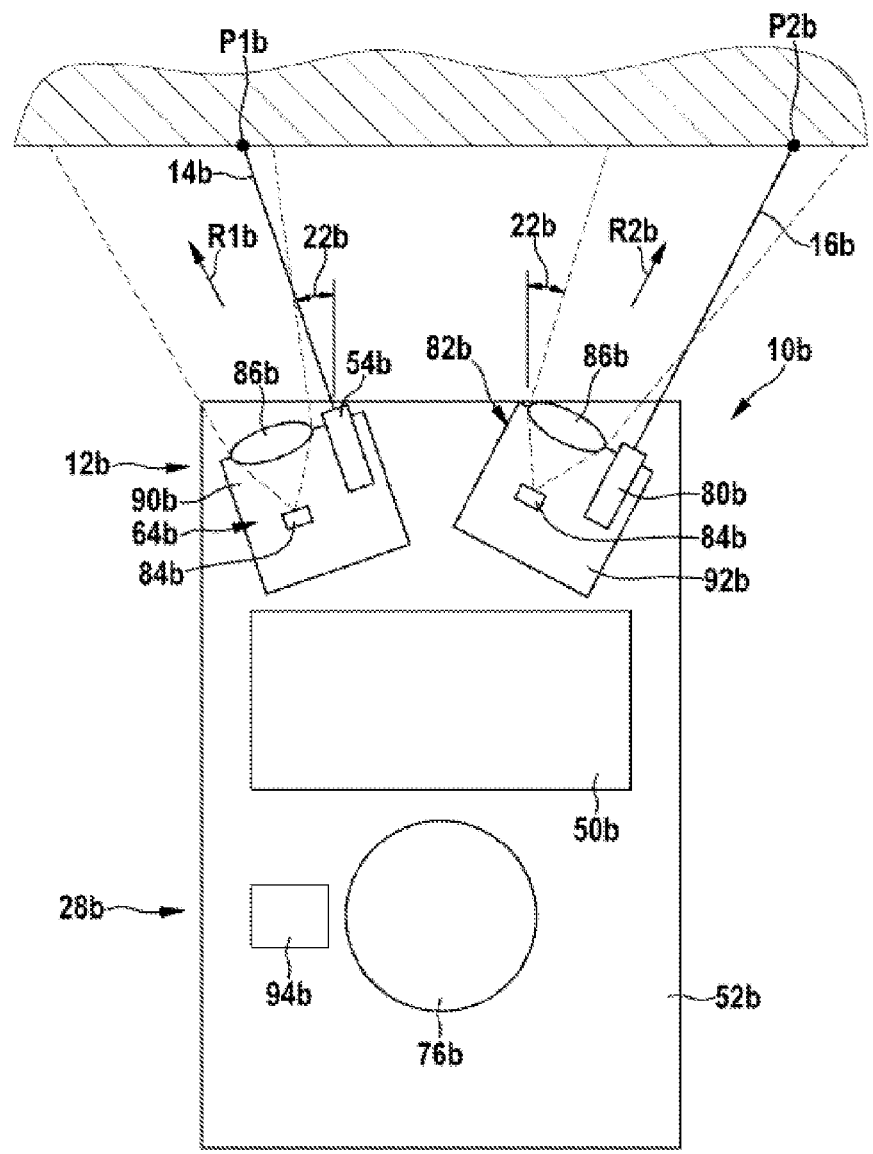
FIG. 3 shows a second exemplary embodiment of the laser distance measuring device from FIG. 1 in a schematic illustration.
Figure 4:
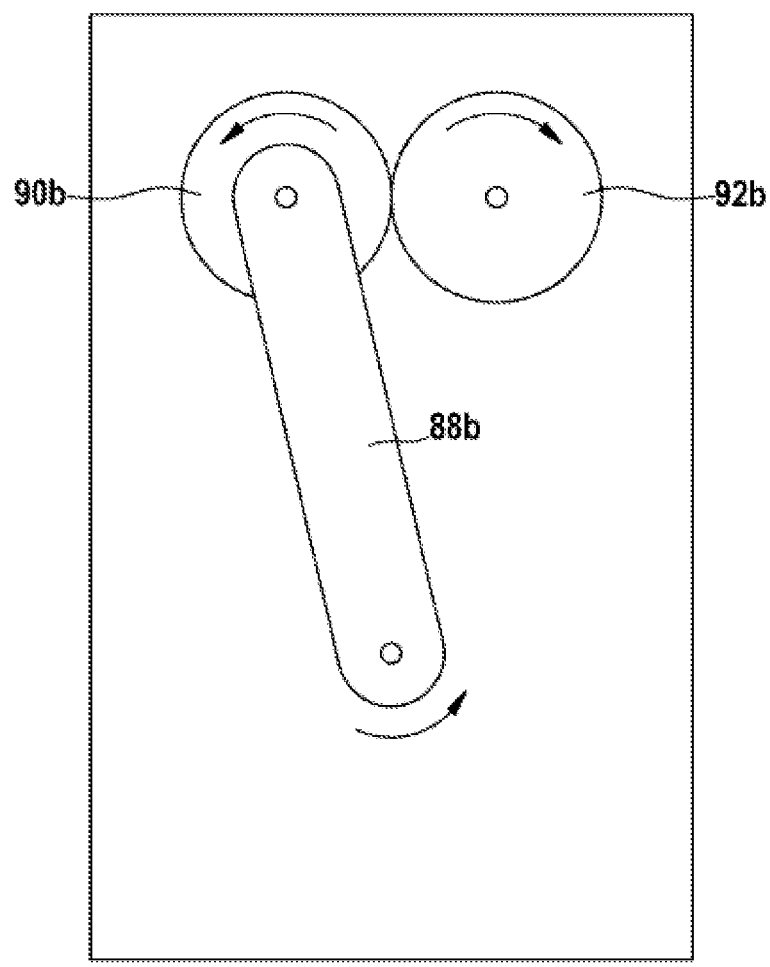
FIG. 4 shows a laser beam guidance means of the laser distance measuring device from FIG. 3 in a schematic illustration and FIG. 5 shows the laser distance measuring device from FIG. 3 in a further operating state.
Figure 5:
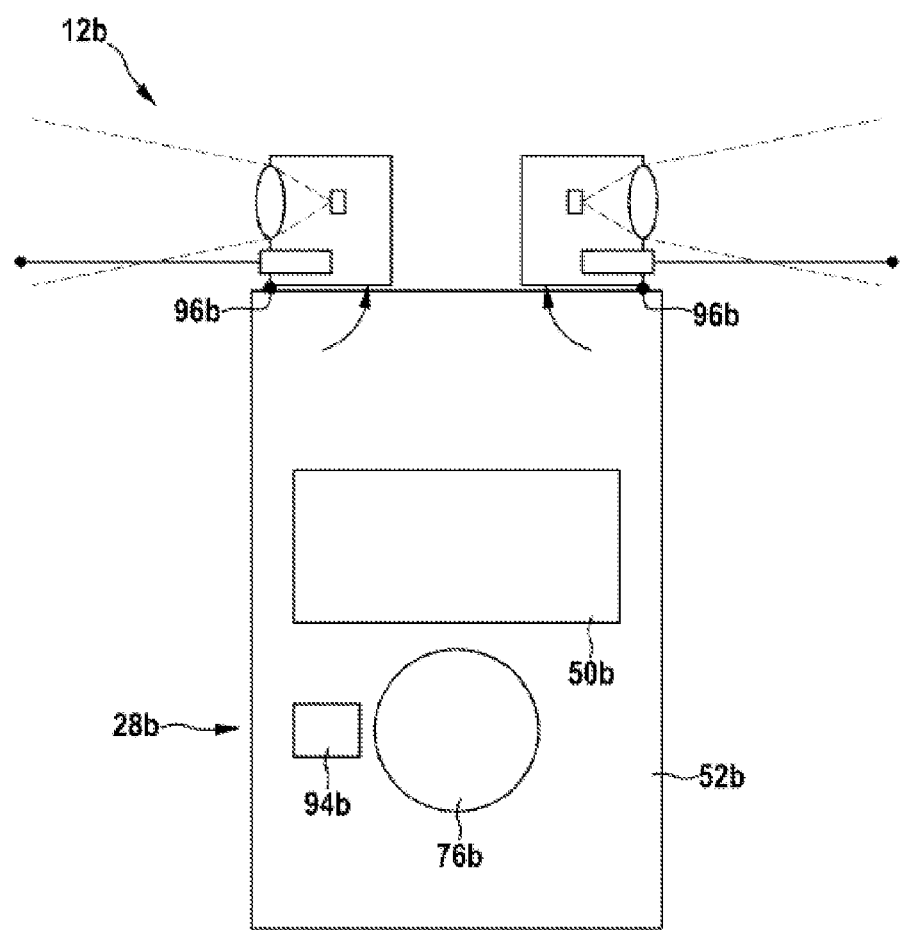

FIGS. 3 to 5 show a further exemplary embodiment of the disclosure. The following descriptions and the drawings restrict themselves substantially to the differences between the exemplary embodiments, wherein, in respect of components that have been referred to in the same way, in particular in respect of components with the same reference signs, reference can also be made, in principle, to the drawings and/or the description of the other exemplary embodiments, in particular FIGS. 1 and 2. In order to make a distinction between the exemplary embodiments, the letter a has been appended to the reference signs of the exemplary embodiment in FIGS. 1 and 2. In the exemplary embodiment of FIGS. 3 to 5, the letter a has been replaced by the letter b.

FIGS. 3 and 4 show a handheld laser distance measuring device 10b with a laser unit 12b, an input unit 28b, a display 50b and a housing 52b. The laser unit 12b comprises two lasers 54b, 80b and two sensors 64b, 82b. The sensors 64b, 82b respectively comprise one photodiode 84b and one lens 86b. Respectively one of the lasers 54b, 80b and one of the sensors 64b, 82b are mounted together in a pivoting fashion relative to the housing 52b. An actuation unit 56b of the laser unit 12b couples a knob 76b of the input unit 28b and the lasers 54b, 80b for mechanically pivoting the lasers 54b, 80b. To this end, the actuation unit 56b comprises a belt 88b and two rotary disks 90b, 92b. Respectively one of the lasers 54b, 80b and one of the sensors 64b, 82b is assembled on each of the rotary disks 90b, 92b. The rotary disks 90b, 92b interlock into one another. In terms of effect, the belt 88b connects the input unit 28b with one of the rotary disks 90b. A person skilled in the art knows of further alternative connection methods. When the input unit 28b rotates, the rotary disks 90b, 92b rotate in opposite directions. Hence, the laser unit 12b is provided to determine respectively one distance in a first relative direction R1b and a second relative direction R2b by means of two laser beams 14b, 16b of the lasers 54b, 80b. To this end, an angular sensor (not illustrated in any more detail) determines angles 20b, 22b of the rotary disks 90b, 92b and a computer unit (not illustrated in any more detail) calculates the distance between two measurement points P1b, P2b of the laser beams 14b, 16b. The operator triggers a measurement by pressing on a key 94b.

In a second measurement mode, illustrated in FIG. 5, the lasers 54b, 80b and the sensors 64b, 82b are pivoted in relative directions R1b, R2b, which are aligned parallel to one another, and the laser beams 14b, 16b are emitted in opposite directions. As a result, the operator can measure distances between two points which are difficult to access in a particularly convenient and efficient fashion. In so doing, the rotary disks 90b, 92b are respectively pivoted out of the housing 52b about a rotational axis 96b. Alternatively, the rotary disks could be pivoted arranged within the housing 52b.

The invention claimed is:
1. A handheld laser distance measuring device comprising:
at least one laser unit including a laser beam guidance apparatus configured to guide a laser beam in different directions, the at least one laser unit being configured (i)

to determine a first distance in a first relative direction using the laser beam, and (ii) to determine, almost simultaneously, at least one second distance in at least one second relative direction that differs relative to the device from the first relative direction, using the laser beam; and an input unit configured to set an angle, at least between the first relative direction and the at least one second relative direction.

2. The laser distance measuring device as claimed in claim 1, further comprising a computer unit configured to set an angle at least between the first relative direction and the at least one second relative direction.

3. The laser distance measuring device as claimed in claim 2, wherein the computer unit is further configured to regulate the laser beam guidance apparatus in an operating mode by virtue of a first measurement point of the first relative direction and a second measurement point of the at least one second relative direction being arranged at a predetermined distance from one another.

4. The laser distance measuring device as claimed in claim 1, further comprising a computer unit configured to determine at least one contour of a measurement object.

5. The laser distance measuring device as claimed in claim 1, further comprising a computer unit configured to determine at least one distance from a measurement point on a first surface to a measurement point on a second surface spaced from the first surface.

6. The laser distance measuring device as claimed in claim 1, further comprising a computer unit configured to determine an angle of intersection between at least two measured surfaces.

7. The laser distance measuring device as claimed in claim 1, wherein the at least one laser unit is further configured to generate at least one projection line.

8. The laser distance measuring device as claimed in claim 1, wherein the at least one laser unit is further configured to project a value of a length of a distance.

9. The laser distance measuring device as claimed in claim 1, further comprising a position capture unit configured to capture at least one alignment of at least the at least one laser unit in space.

10. The laser distance measuring device as claimed in claim 9, further comprising a computer unit configured to calculate a further distance at least from an alignment captured by the position capture unit and two distances measured in a same relative direction.

11. The laser distance measuring device as claimed in claim 1, wherein the at least one laser unit determines the first distance and the second distance within 500 ms.

12. The laser distance measuring device as claimed in claim 1, wherein the at least one laser unit determines the first distance and the at least one second distance within 50 ms.

* * * * *